Sept. 18, 1956
T. F. FOSTER
2,763,384
BOAT TRAILER
Filed Oct. 28, 1954
2 Sheets-Sheet 1
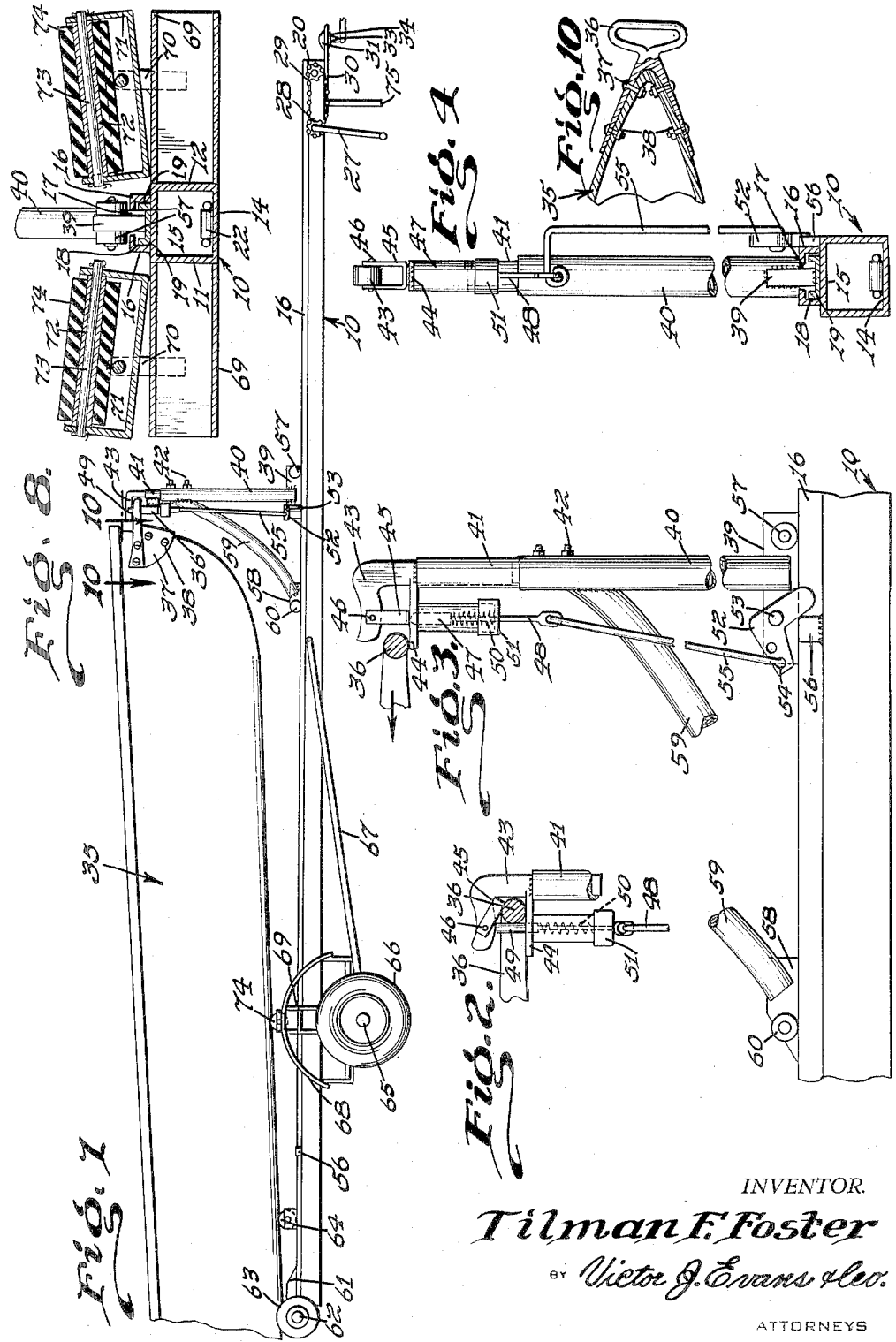
INVENTOR.
Tilman F. Foster
BY Victor J. Evans & Co.
ATTORNEYS

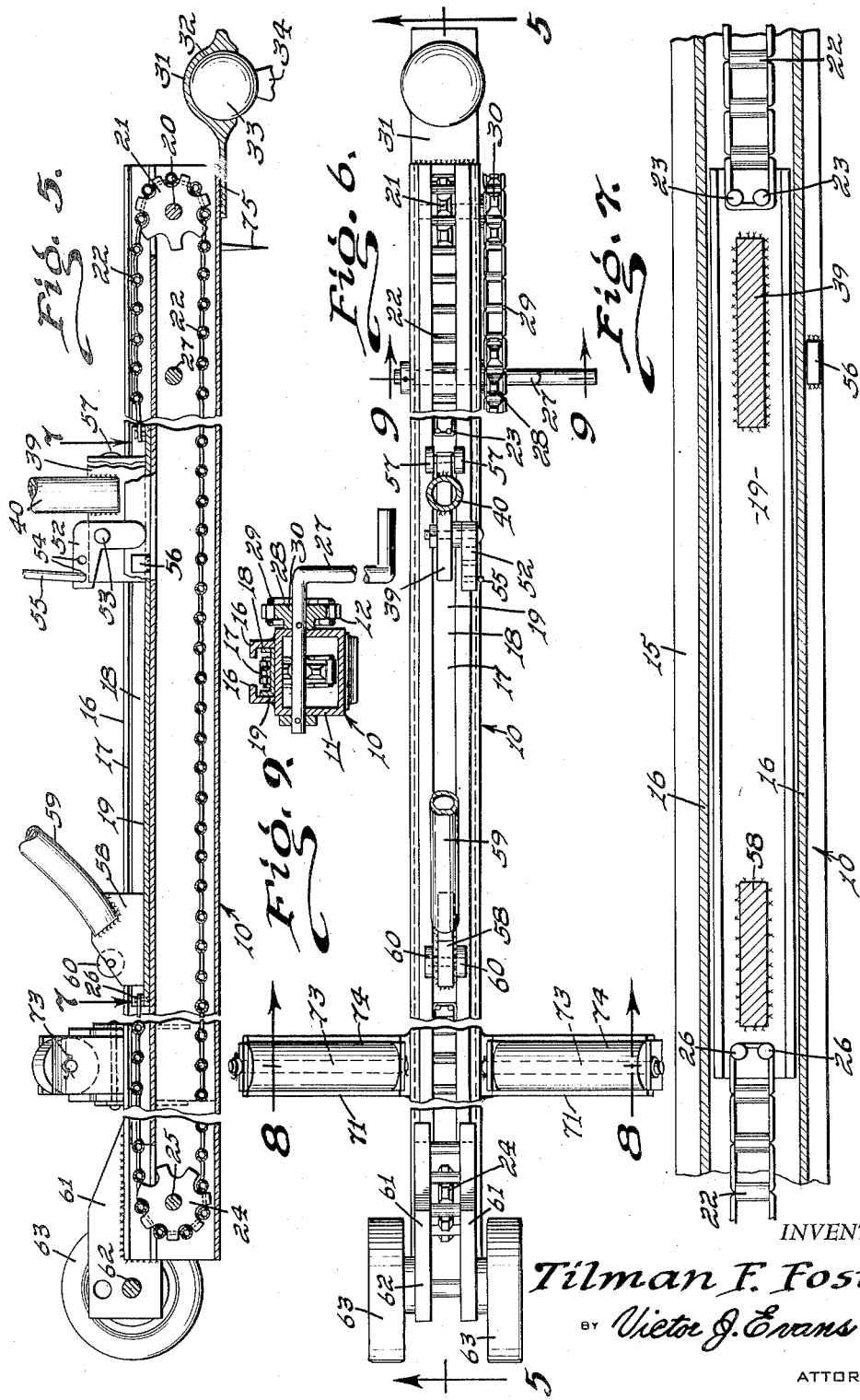

United States Patent Office 2,763,384
Patented Sept. 18, 1956

2,763,384

BOAT TRAILER

Tilman F. Foster, Muldrow, Okla.

Application October 28, 1954, Serial No. 465,383

3 Claims. (Cl. 214—84)

This invention relates to a boat trailer, and more particularly to a boat trailer which includes a manually operable means for loading and unloading the boat onto the trailer.

The object of the invention is to provide a boat trailer which is constructed so that the loading and unloading of boats therefrom will be facilitated.

Another object of the invention is to provide a mobile trailer which includes a receiver or head that is adapted to be arranged in engagement with a ring that is secured permanently to the front end of a boat, whereby upon actuation of a manually operable crank, the boat can be positioned on the trailer or unloaded therefrom with a minimum of effort and time.

A further object of the invention is to provide a boat trailer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the boat loaded on the trailer of the present invention.

Figure 2 is a fragmentary side elevational view showing the upper end of the receiver, and with the ring of the boat in section, and showing the ring locked in place in the receiver by the spring pressed rod.

Figure 3 is a fragmentary side elevational view similar to Figure 2, but showing the ring of the boat disengaged from the receiver as when the bell crank lever is tripped by the trip lug so that the boat can be unloaded.

Figure 4 is a transverse sectional view taken at right angles to the view shown in Figure 3.

Figure 5 is a vertical longitudinal sectional view taken through the boat trailer.

Figure 6 is a top plan view of the trailer.

Figure 7 is a sectional view taken on the line 7—7 of Figure 5.

Figure 8 is a sectional view taken on the line 8—8 of Figure 6.

Figure 9 is a sectional view taken on the line 9—9 of Figure 6.

Figure 10 is a sectional view taken on the line 10—10 of Figure 1 and showing the ring which is permanently secured to the front of the boat.

Referring in detail to the drawings, the numeral 10 designates a hollow elongated rectangular beam which can be made of any suitable material such as metal, and the beam 10 includes a pair of spaced parallel vertically disposed side walls 11 and 12, a bottom wall 14, and a top wall 15. Secured to the top wall 15 and extending upwardly therefrom is a pair of spaced parallel opposed angle irons 16. The upper portions of the angle irons 16 are spaced apart to define a slot 17 for a purpose to be later described, and the angle irons 16 coact with the top wall 15 to define therebetween a trackway 18. Slidably mounted in the trackway 18 is a channel member 19, Figure 8.

Mounted in the front end of the beam 10 is a shaft 20 which has a sprocket 21 thereon, Figure 5, and a chain 22 is arranged in engagement with the sprocket 21. The chain 22 extends through the hollow beam 10, and one end of the chain 22 is secured to the front end of the channel member 19 by suitable securing elements 23. The chain 22 is also trained over a sprocket 24 which is mounted on a shaft 25, and the other end of the chain 22 is secured to the rear of the channel member 19 by suitable securing elements 26, Figure 7.

A manually operable means is provided for moving the chain 22, and this means comprises a crank 27 which has a portion extending through the front section of the beam 10, and a sprocket 28 is mounted on the crank 27. An endless chain 29 is trained over the sprocket 28, and the endless chain 29 is also trained over a sprocket 30 which is mounted on the shaft 20. Thus, by rotating the crank 27 in one direction, the chain 29 will be caused to move in one direction and this in turn will cause rotation of the sprockets 30 and 21 which are both on the same shaft 20. Thus, there will result a movement of the chain 22 and channel member 19. Consequently when the crank 27 is rotated in the opposite direction, the channel member 19 will be moved in the opposite direction so that a boat can be loaded or unloaded onto the trailer of the present invention.

Extending forwardly from the lower front end of the beam 10 and secured thereto or formed integral therewith is a tongue 31 which is provided with a socket 32 for snugly receiving therein a ball 33 which is secured to a drawbar 34. The drawbar 34 may be attached to the rear of a towing vehicle such as a truck or automobile. Thus, the ball 33 and socket 32 permit the trailer having the boat 35 thereon to be towed to any desired locality. The boat 35 is modified to the extent that it has a ring 36 arranged on its front end, and the ring 36 may be secured to the front of the boat 35 by means of bolt and nut assemblies 38 which extend through plates 37, and the plates 37 are secured to the ring 36, as shown in Figure 10.

Extending upwardly from the front of the channel member 19 and secured thereto in any suitable manner, as for example by welding is a first fin 39. A tube 40 is secured to the fin 39 in any suitable manner, and the vertically disposed tube 40 has a post 41 projecting upwardly therefrom. The post 41 may be connected to the tube by suitable securing elements 42, Figure 3. Secured to the upper end of the post 41 is an L-shaped finger 43, and projecting outwardly from the bottom of the finger 43 and secured thereto is a horizontally disposed bar 44. A U-shaped stirrup or yoke 45 is pivotally connected to the finger 43 by means of a pin 46. Secured to the lower surface of the bar 44 and depending therefrom is a hollow casing 47, and a base 51 may be arranged in threaded engagement with the lower end of the casing 47. A reciprocatory rod 48 extends up into the casing 47, and the rod 48 has an enlarged head 49 on its upper end, Figure 2. A coil spring 50 is circumposed on the rod 48 and abuts the lower end of the head 49 for a purpose to be later described. Pivotally connected to the fin 39 is an L-shaped bell crank lever 52, and the lever 52 may be connected to the fin by means of a pivot pin 53. The lever 52 is provided with openings 54, and the lower end of a link 55 is adapted to be connected to one of the openings 54, while the upper end of the link 55 is arranged in engagement with the bottom of the rod 48, Figure 3. A trip lug 56 is secured to the beam 10 in any suitable manner, as for example by welding, and the trip lug 56 is adapted to cause pivotal movement of the lever 52 as shown in Figure 3 when the fin is moving backward so that the rod 48 will be pulled downwardly against the tension of the coil spring 50 whereby the head 49 will move down out of engagement with the ring 36 to permit the boat 35 to be unloaded. As soon as the ring 36 clears the bar 44, the stirrup 45 will swing down to the vertical position of Figure 3 so as to prevent upward movement of the head 47 until a boat is being loaded on the trailer since when a boat is being loaded on the trailer, the ring 36 will cause swinging movement of the stirrup 45 from the position shown in Figure 3 to the position shown in Figure 2 whereby the spring 50 can force the head 49 up to lock the ring between the finger 43 and the bar 44.

Wheels 57 are journaled on the fin 39, and the wheels 57 are adapted to run along the angle iron 16, the wheels facilitating the movement of the fin and its associated parts.

Spaced rearwardly of the fin 39 is a second fin 58 which has a brace 59 secured thereto, and the upper front end of the brace 59 is secured to the tube 40 as by welding. Wheels 60 are journaled on the fin 58, and the wheels 60 also rotatably engage the tops of the angle irons 16, Figure 3.

Extending upwardly from the rear end of the beam and secured thereto as by welding, is a pair of lugs or ears 61 which have a shaft 62 extending therebetween, Figure 5, and rollers or wheels 63 are mounted on the shaft 62. The rollers 63 engage the lower portion of the boat 35 so as to facilitate movement of the boat onto and off of the trailer. Additional rollers 64 may be supported on the beam, Figure 1, and these rollers 64 also make movement of the boat more easy.

Extending transversely below the beam 10 and operatively connected thereto is a horizontally disposed axle 65 which has a pair of ground engaging wheels 66 thereon. Braces 67 may extend between the axle 65 and the beam 10, Figure 1, and fenders 68 of curved shape may be positioned above the wheels 66 for providing protection for the wheels. Extending transversely or at right angles with respect to the beam 10 and secured thereto is a pair of arms 69, Figure 8, and the arms 69 serve to support upstanding fingers or ears 70 which have a bracket 71 secured thereto as for example by means of a suitable securing element or pin 72. A shaft 73 is carried by each of the brackets 71, and a roller 74 which may be made of yieldable material such as rubber is mounted on each shaft 73. The pair of rollers 74 are arranged angularly with respect to each other so as to provide a cradle to facilitate unloading and loading of the boat 35. A lip 75 depends from the front end of the beam 10 whereby a support will be provided for the front of the trailer even when it is detached from the towing vehicle.

From the foregoing it is apparent that there has been provided a boat trailer whereby a boat such as the boat 35 having the ring 36 secured thereto can be readily loaded thereon or unloaded therefrom. In use the boat 35 may be loaded on the trailer by moving the boat 35 until the ring 36 engages the receiver shown in Figures 2, 3 and 4. Thus, the fin 39, post 40 and associated parts are in their rearmost position on the trailer when the boat is to be loaded thereon, and then the boat is moved so that the ring 36 pushes the stirrup 45 aside as shown in Figure 2. Then the spring 50 will urge the head 49 up through the ring 36 to thereby lock the ring between the finger 43 and the bar 44. Next the crank 27 is manually rotated to thereby move the chain 29 and this in turn causes movement of the chain 22 due to the previously described sprocket arrangement. As the chain 22 is moved, the channel member 19 will be pulled forwardly, providing the crank 27 is rotated in the proper direction. Thus, with the channel member 19 moving forwardly the fin 39 will move forwardly through the slot 17 since the fin 39 is secured to the channel member 19. Thus this forward movement will result in the boat 35 being pulled up onto the trailer and the wheels 63, 64 and 74 will insure that the boat will easily roll onto the trailer. After the boat has been positioned properly on the trailer, the trailer can be towed by means of the ball 33 and tongue 31 by any suitable towing vehicle such as an automobile.

To unload the boat 35 for example after the destination has been reached, the crank 27 is rotated in the opposite direction from that previously described whereby the channel member 19 will move rearwardly in the trackway 18. This will cause the fin 39 and fin 58 to move rearwardly since these fins are secured to the channel member. When the fin 39 moves back far enough to the trip lug 56, then the trip lug 56 will cause pivotal movement of the bell crank lever 52 from the position shown in Figure 5 to the position shown in Figure 3 and this will cause the link 55 to depress the head 49 so that the ring 36 will be able to move out from between the finger 43 and the bar 44. As soon as the ring 36 moves out sufficiently as shown in Figure 3 the stirrup 45 will move to a vertical position to hold the head 47 down until a boat ring is again inserted therein to move the stirrup 45 aside. The various rollers carry the thrust or weight of the boat. While the device has been described and illustrated as being manually operated, if desired a motor could be mounted on the front end of the tongue. Then, by using an extension cord from the bar battery, the device could be loaded or unloaded by power.

I claim:
1. A trailer for handling a boat having a ring secured to its upper front end, comprising a hollow rectangular elongated beam including a pair of spaced parallel vertically disposed side walls, top and bottom walls, a pair of angle irons secured to said top wall and said angle irons having their upper ends spaced from each other to define a slot therebetween, said angle irons and top wall coacting to define a trackway, a channel member slidably mounted in said trackway, a first shaft journaled in the front of said beam, a first sprocket journaled on said first shaft, a second shaft journaled in the rear of said beam, a second sprocket journaled on said second shaft, a movable chain trained over said sprockets and secured to the front and rear ends of said channel member, a manually operable means for moving said chain, a first fin secured to the upper front portion of said channel member and extending through said slot, wheels journaled on said fin for engagement with said angle irons, a vertically disposed tube extending upwardly from said fin and secured thereto, a post extending upwardly from said tube, an L-shaped finger secured to the upper end of said post, a U-shaped stirrup pivotally connected to said finger, a horizontally disposed bar extending outwardly from said finger, a casing depending from said bar, a reciprocating rod reciprocably arranged in said casing and having an enlarged head on its upper end, a coil spring positioned in said casing and circumposed on said rod and abutting said head, said rod adapted to extend through a ring on the front of a boat, wheels mounted below said beam for engagement with the ground, a bell crank lever pivotally connected to said fin, a trip lug secured to said beam for causing pivotal movement of said lever, a link extending between said lever and said rod, a second fin secured to said channel member and spaced rearwardly from said first fin, wheels journaled on said last named fin for engaging said angle irons, a brace extending between said second fin and said tube, a pair of spaced parallel ears secured to the rear of said beam, rollers mounted on said ears for engagement with the bottom of a boat, said manually operable means comprising a crank having a portion extending through said beam, chain and sprocket means connecting said crank to said chain, a tongue extending forwardly from said beam and provided with a socket in its lower surface for receiving a ball hitch therein, and a lip depending from the front end of said beam for at times supporting the front of the trailer.

2. In a boat trailer, an elongated beam including a pair of spaced parallel vertically disposed side walls, top and bottom walls, a pair of angle irons secured to said top wall and having their upper ends spaced from each other to define a slot therebetween, said angle irons and top wall coacting to define a trackway, a channel member slidably mounted in said trackway, a first sprocket journaled in the front of said beam, a second sprocket journaled in the rear of said beam, a movable chain trained over said sprockets and secured to the front and rear ends of said channel member, a manually operable means for moving said chain, a first fin secured to said channel member and extending through said slot, a vertically disposed tube extending upwardly from said tube, an L-shaped finger secured to the upper end of said post, a U-shaped stirrup pivotally connected to said finger, a horizontally disposed bar extending outwardly from said finger, a casing depending from said bar, a rod reciprocally arranged in said casing, a coil spring positioned in said casing and circumposed on said rod, said rod adapted to extend through a ring on the front of a boat, wheels mounted below said beam for engagement with the ground, a bell crank lever pivotally connected to said fin, a trip lug secured to said beam for causing pivotal movement of said lever, a link extending between said lever and said rod, a second fin secured to said channel member, a brace extending between said second fin and said tube, a pair of spaced parallel ears secured to the rear of said beam, and rollers mounted on said ears for engagement with the bottom of a boat, and a tongue extending forwardly from said beam and provided with a socket in its lower surface for receiving a ball hitch therein.

3. A trailer for handling a boat having a ring secured to its upper front end, comprising a beam including a pair of side walls, top and bottom walls, a pair of angle irons secured to said top wall and said angle irons having their upper ends spaced from each other to define a slot therebetween, said angle irons and top wall coacting to define a trackway, a channel member slidably mounted in said trackway, a first shaft journaled in the front of said beam, a first sprocket journaled on said first shaft, a second shaft journaled in the rear of said beam, a second sprocket journaled on said second shaft, a movable chain trained over said sprockets and secured to the front and rear ends of said channel member, a manually operable means for moving said chain, a first fin secured to the upper front portion of said channel member and extending through said slot, wheels journaled on said fin for engagement with said angle irons, a tube extending upwardly from said fin and secured thereto, a post extending upwardly from said tube, a finger secured to the said post, a stirrup pivotally connected to said finger, a bar extending outwardly from said finger, a casing depending from said bar, a reciprocating rod reciprocably arranged in said casing and having an enlarged head on its upper end, resilient means positioned in said casing and circumposed on said rod and abutting said head, said rod adapted to extend through a ring on the front of a boat, wheels mounted below said beam for engagement with the ground, a bell crank lever pivotally connected to said fin, a trip lug secured to said beam for causing pivotal movement of said lever, a link extending between said lever and said rod, a second fin secured to said channel member, wheels journaled on said last named fin for engaging said angle irons, a brace extending between said second fin and said tube, a pair of ears secured to the rear of said beam, rollers mounted on said ears for engagement with the bottom of a boat, said manually operable means comprising a crank having a portion extending through said beam, chain and sprocket means connecting said crank to said chain, a tongue extending from said beam and provided with a socket for receiving a ball hitch therein, and a lip depending from said beam for at times supporting the front of the trailer.

References Cited in the file of this patent
UNITED STATES PATENTS

| | | |
|---|---|---|
| 2,258,988 | Le Laurin | Oct. 14, 1941 |
| 2,496,599 | Rivers | Feb. 7, 1950 |
| 2,558,418 | Brueckman | June 26, 1951 |
| 2,636,745 | Cartwright | Apr. 28, 1953 |
| 2,676,716 | Sallis | Apr. 27, 1954 |
| 2,691,534 | Sampsell | Oct. 12, 1954 |